United States Patent
Rogers et al.

(10) Patent No.: US 7,151,670 B2
(45) Date of Patent: Dec. 19, 2006

(54) DIGITAL MICROMIRROR DEVICE MOUNTING SYSTEM

(75) Inventors: Tony Rogers, Milwaukie, OR (US); Clark Wilson, Clackamas, OR (US); Gary Cook, Aloha, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 11/129,604

(22) Filed: May 13, 2005

(65) Prior Publication Data
US 2005/0270747 A1    Dec. 8, 2005

Related U.S. Application Data

(63) Continuation of application No. 10/860,375, filed on Jun. 2, 2004, now Pat. No. 6,914,783.

(60) Provisional application No. 60/475,367, filed on Jun. 2, 2003.

(51) Int. Cl.
*H05K 7/20* (2006.01)

(52) U.S. Cl. ............ 361/709; 361/702; 361/704; 257/706; 359/237

(58) Field of Classification Search ........ 361/702–709, 361/710–719, 103, 686; 165/80.2, 80.3, 165/80.4, 185; 257/706–727, 682–689, 787; 174/15.1, 16.3, 252, 253; 29/837; 359/152, 359/224, 237, 290; 156/60, 182, 297, 299; 348/335–339
See application file for complete search history.

(56) References Cited

U.S. PATENT DOCUMENTS

| | | | |
|---|---|---|---|
| 5,467,146 | A | 11/1995 | Huang et al. |
| 5,870,286 | A | 2/1999 | Butterbaugh et al. |
| 6,072,617 | A | 6/2000 | Henck |
| 6,647,039 | B1 | 11/2003 | Fu et al. |
| 6,720,206 | B1 | 4/2004 | Choi |
| 6,751,027 | B1 | 6/2004 | Van Den Bossche et al. |
| 6,773,532 | B1 | 8/2004 | Wolf et al. |
| 6,816,375 | B1 | 11/2004 | Kalyandurg |
| 2003/0210452 | A1 | 11/2003 | Haskett et al. |
| 2004/0190281 | A1 | 9/2004 | Williams et al. |
| 2004/0217464 | A1 | 11/2004 | Denneau et al. |

*Primary Examiner*—Michael Datskovskiy
(74) *Attorney, Agent, or Firm*—Alleman Hall McCoy Russell & Tuttle LLP

(57) ABSTRACT

A projection device is provided, wherein the projection device includes a digital micromirror device, a circuit board that further includes a first face and a second face, an integrated heat sink/stiffener; and a plurality of engagement mechanisms, wherein the plurality of engagement mechanisms is adapted to operatively couple the digital micromirror device to the first face of the circuit board and to secure the integrated heat sink/stiffener to the second face of the circuit board; and wherein the integrated heat sink/stiffener is adapted to provide structural support to the circuit board and to draw thermal energy away from the digital micromirror device.

20 Claims, 3 Drawing Sheets

DIGITAL MICROMIRROR DEVICE MOUNTING SYSTEM

CROSS-REFERENCE TO RELATED APPLICATIONS

The present application is a continuation of application Ser. No. 10/860,375, filed Jun. 2, 2004, now U.S. Pat. No. 6,914,783 which claims the benefit of U.S. Provisional Application Ser. No. 60/475,367, filed Jun. 2, 2003. Both applications are hereby incorporated by reference in their entirety for all purposes.

TECHNICAL FIELD

The present disclosure relates generally to mounting systems for digital micromirror devices and other like components within an electrical device.

BRIEF DESCRIPTION OF THE DRAWINGS

The disclosure is illustrated by way of example and not by way of limitation in the figures of the accompanying drawings, in which the like references indicate similar elements and in which.

DETAILED DESCRIPTION

Figure 1:
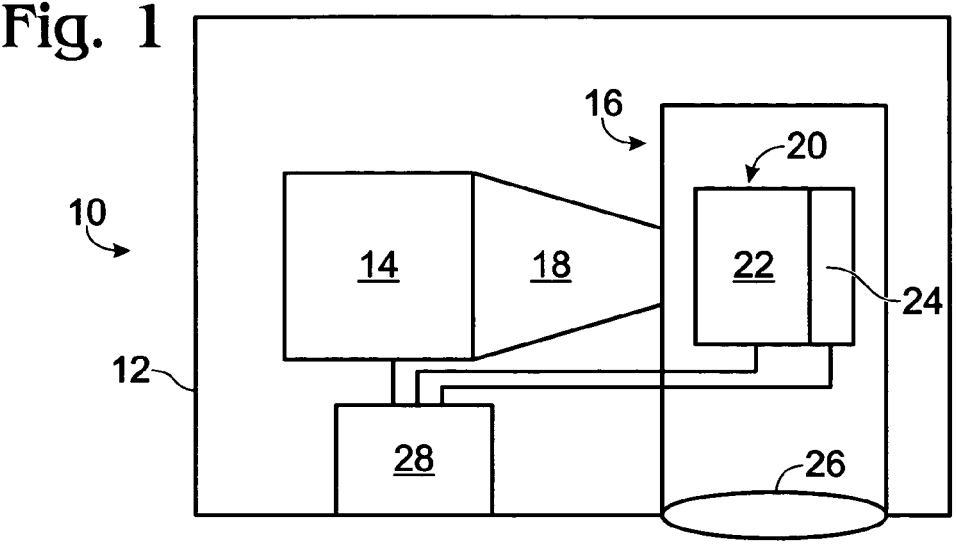
FIG. 1 is a schematic illustration of an embodiment of a projection device, including a digital micromirror device coupled to a circuit board within the optical engine of the projection device.

A projection device 10 is illustrated schematically in FIG. 1. Projection device 10 may be a projector adapted to project an image onto a display surface such as a screen, a wall, or other viewing surface or area. Projection device 10 may be any suitable display device or image projector including, but not limited to, a digital projector, a liquid crystal display (LCD) projector, a digital light processing projector, etc.

In some configurations, the projection device may include components disposed generally within a casing 12, such as a light source 14 and an optical engine (or light engine) 16. Light source 14 may be adapted to produce a beam of light and project the light toward optical engine 16.

Light source 14 may include a lamp, such as a metal halide lamp or an ultra-high-pressure (UHP) arc lamp, positioned within a reflector, which may be configured to direct most of the emitted light along a predetermined path. For example, light emitted from light source 14 may be channeled through a spacer or interface tube 18, to the optical engine. The emitted light may also pass through one or more filters, such as an infrared (IR) or ultraviolet (UV) filter, to filter out unwanted parts of the emission spectra of the lamp.

Optical engine 16 may include optical elements such as filters, lenses, mirrors, condensers, and the like. Optical engine 16 may also include an image-producing element 20 such as a digital micromirror device (DMD) 22, which may be coupled to a circuit board 24. Although a DMD is shown, other embodiments may optionally include image-producing elements such as an LCD panel or any other suitable image-producing element. Image-producing element 20 may be configured to project light toward one or more mirrors or other optics, such as a projection lens 26, which in turn may be configured to direct light toward a display surface.

Projection device 10 may further include a power supply 28, which may be linked to components such as light source 14, image-producing element 20, circuit board 24, and/or other components within the projection device. Some projection devices may include more than one power supply disposed throughout the casing.

In projection device 10, a mounting system may be used to operatively couple circuit board 24 with DMD 22. Such a mounting system may align the components optically, electrically, and/or mechanically.

Overall performance of the projection device may be related to the accuracy of the alignment. Thus, a mounting system may include one or more engagement mechanisms, which may in turn apply compressive force to urge the various parts against each other. Optionally, a mounting system may include a stiffening member to provide structural support to the circuit board, such as to prevent such compressive force from deforming the circuit board.

Image-producing element 20 may output heat during use, and thus may increase the temperature of a projection device during use. If the temperature of the device exceeds critical limits, portions of the device, such as a circuit board, may malfunction and/or have a shorter life span. Maintaining temperatures within the device at operating levels thus may prevent the device from malfunctioning and/or increase the lifespan of components and parts of the projection device. Thus, a mounting system may also include a heat-dissipating member.

Figure 2:
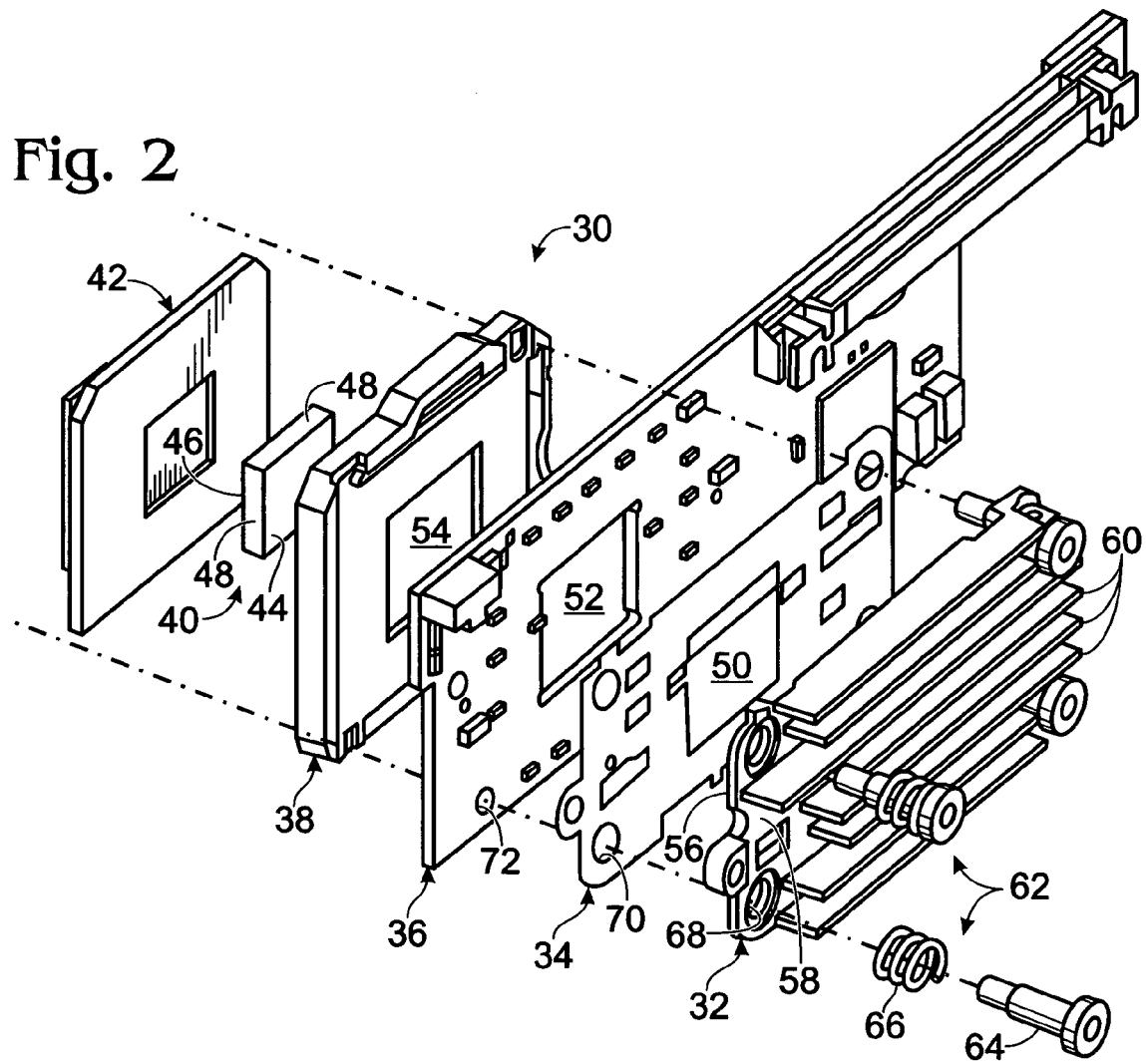
FIG. 2 is an exploded view of an embodiment of a mounting system for a digital micromirror device, showing exemplary components of the mounting system.
Figure 3:
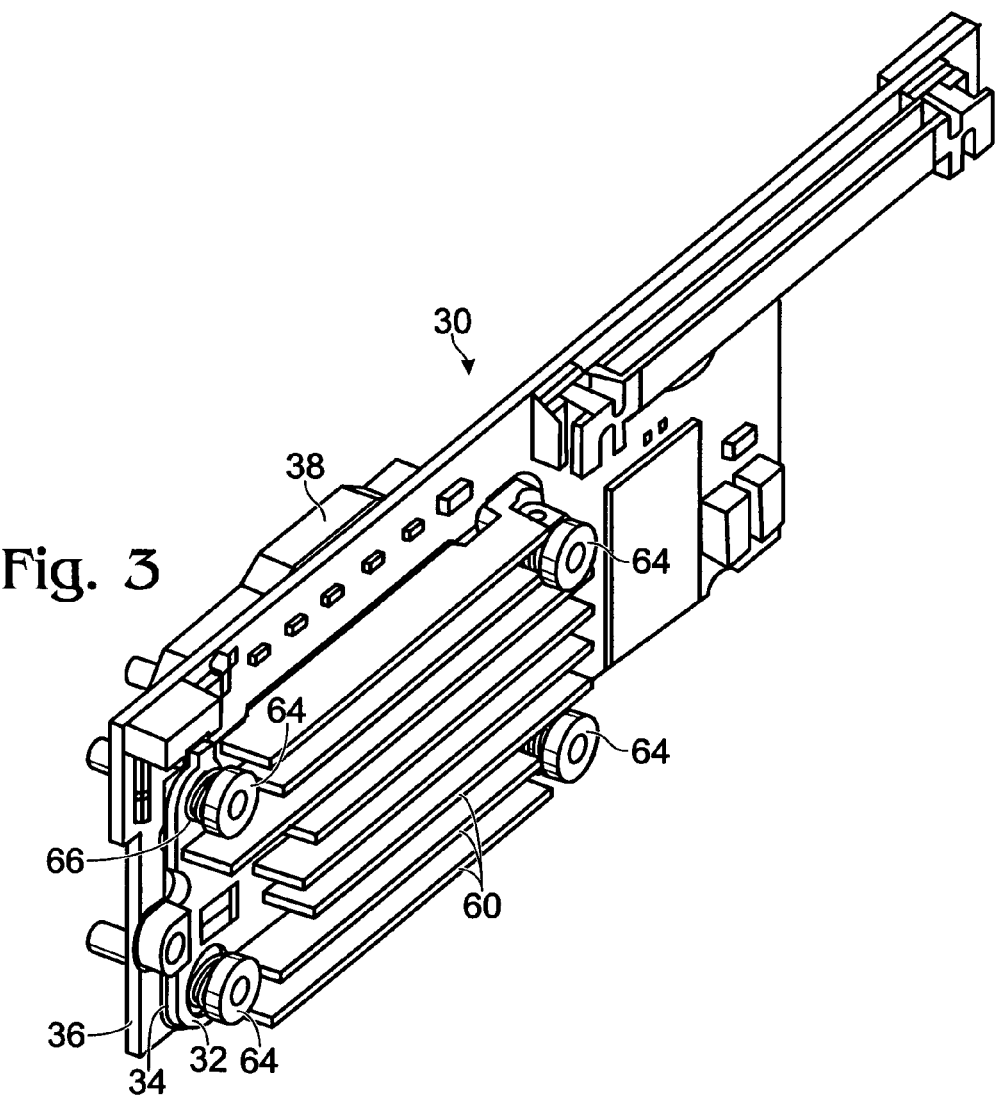
FIG. 3 is an isometric view of the embodiment of FIG. 2, illustrating an exemplary configuration in which the components may be assembled.
Figure 4:
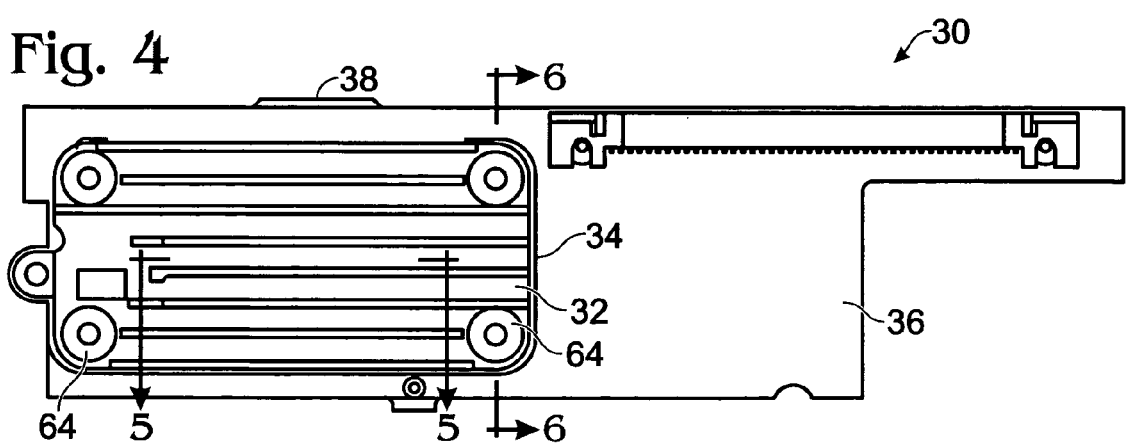
FIG. 4 is an elevation view of the embodiment of FIG. 2.

In a projection device having a compact design, a multifunctional integrated mounting system may be used to minimize the components used to mount and maintain the DMD in a desired alignment. FIG. 2 illustrates an exploded view of such a DMD mounting system, indicated generally at 30, which may include a heat sink/stiffener 32, a thermally and/or electrically insulating layer 34, a circuit board 36, a spacer 38, and a thermally conductive element, for example, a conductive polymer silicone pad 40, attached to a DMD 42 (which may be attached to its own circuit board). A non-limiting example of suitable materials for thermally conductive element 40, include silicone rubber or silicone. FIGS. 3 and 4 illustrate views of DMD mounting system 30 in an assembled configuration.

Figure 5:
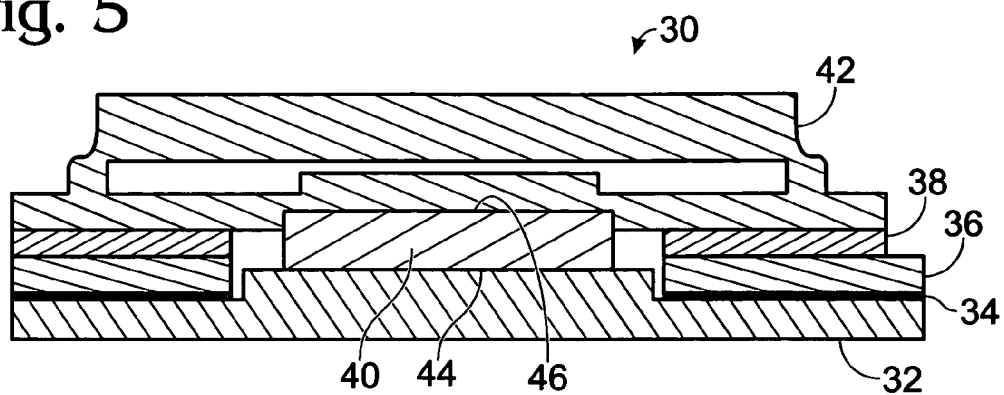
FIG. 5 is a cross-sectional view of the embodiment of FIG. 2, taken along the line 5—5 of FIG. 4.

Silicon pad 40 is shown as a square-shaped member with as front face 44, a back face 46 and a plurality of sides 48. Also, each of insulating layer 34, circuit board 36, and spacer 38 is illustrated to include an aperture (numbered 50, 52, 54, respectively) adapted to accommodate silicon pad 40. Thus, as perhaps more clearly shown in FIG. 5, silicon pad 40 may be "sandwiched" between DMD 42 and heat sink/stiffener 32 when DMD mounting system 30 is in an assembled configuration. Specifically, part of front face 44 of silicon pad 40 may be held against heat sink/stiffener 32, and part of back face 46 may be held against DMD 42. Thus, silicon pad 40 may conduct heat away from DMD 42 towards heat sink/stiffener 32. Spacer 38 may also help to further insulate DMD 42 while providing conductive pathways between circuit board 36 and DMD 42.

Further, apertures 50, 52, 54 may be shaped such that sides 48 of silicon pad 40 may be prevented from contacting circuit board 36 when DMD mounting system 30 is in an assembled configuration, which may prevent conductive heat transfer from DMD 42 and/or silicon pad 40 to circuit board 36.

Multiple functionalities may be integrated into individual components of DMD mounting system 30. For example, in the depicted embodiment, heat sink/stiffener 32 is adapted both to stiffen circuit board 36 and to operate as a heat sink. Thus, heat sink/stiffener 32 may be fabricated from a rigid, thermally conductive material. Returning to FIG. 2, heat sink/stiffener 32 may include a first side 56 contoured similarly to circuit board 36, such as to ensure a secure fit when held against circuit board 36. First side 44 may further be shaped to fit silicon pad 40, for example to assure a secure mechanical interface, and/or to enable efficient heat transfer from silicon pad 40 to heat sink/stiffener 32. Heat sink/stiffener 32 may further include a second side 46 including a plurality of formations 48 to enlarge to surface area of the second side to dissipate thermal energy. Formations 48 are shown as ridges, but other formations may be used.

Insulating layer 34 may be interposed between heat sink/stiffener 32 and circuit board 36, and may consist of a thin layer of thermally insulating material. Insulating layer 34 may thus prevent thermal energy transferred to heat sink/stiffener 32 from passing to circuit board 36 rather than dissipating from formations 48.

Insulating layer 34 is illustrated in FIG. 2 as a separate component from heat sink/stiffener 32. In some embodiments, the insulating layer may be integrated with the heat sink/stiffener, which may further decrease the profile of the DMD mounting system and decrease the number of separate components used. For example, the area or areas of the first side of the heat sink/stiffener adapted to contact the circuit board may be treated with a thermally insulating material; the insulating layer may be fabricated and subsequently adhered to the heat sink/stiffener, and so forth.

Insulating layer 34, heat sink/stiffener 32, and other components of DMD mounting system 30 may be held in an assembled configuration by means of a plurality of engagement mechanisms 62, shown in FIG. 2 to each include a mounting screw 64 and a compression spring 66. Engagement mechanisms 62 may provide compressive force to electrically, mechanically, and/or optically align the individual components of DMD mounting system 30. Specifically, mounting screws 64 may fit through compression springs 66 and further through screw holes 68, 70, and 72, respectively disposed on heat sink/stiffener 32, insulating layer 34, and circuit board 36.

The configuration of engagement mechanisms 62 may be varied in order to apply a desired amount of compressive force to DMD mounting system 30. For example, various springs may be used to increase or decrease the compressive force applied to the system. Additionally, tightening or loosening of screws 64 may adjust the amount of compressive force of the mounting system. Thus, the use of the combination of multiple screws and springs may enable adjustment and application of a desired compressive force.

As can also be seen in FIGS. 3 and 4, four engagement mechanisms 62 are shown in the four corners of heat sink/stiffener 32. Application of compressive force to the exterior perimeter of heat sink/stiffener 32 and other components of DMD mounting system 30 may enable precise control of the pressure exerted on the center of DMD 42. However, any number of engagement mechanisms and position for such engagement mechanisms may be used to provide an adequate compressive force.

Figure 6:
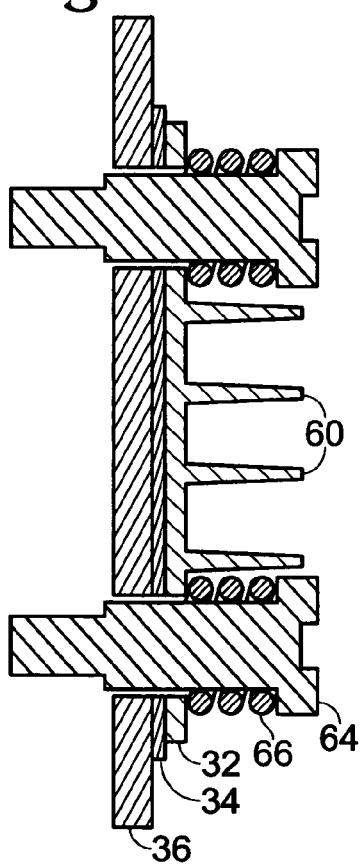
FIG. 6 is a cross-sectional view of the embodiment of FIG. 2, taken along the line 6—6 of FIG. 4.
Figure 7:
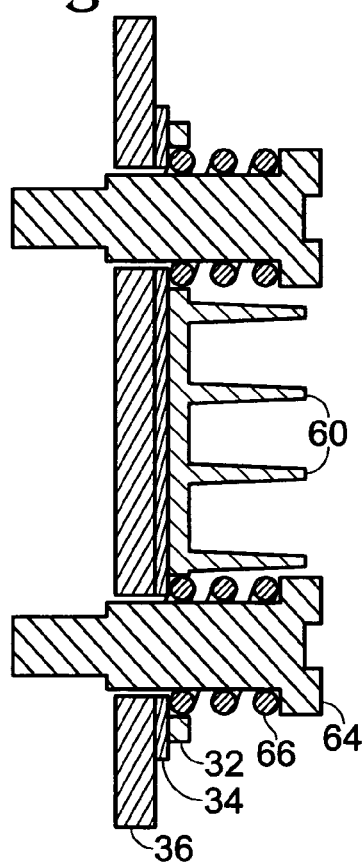
FIG. 7 is a cross-sectional view similar to than of FIG. 6, illustrating another embodiment of a digital micromirror device mounting system.
Figure 8:
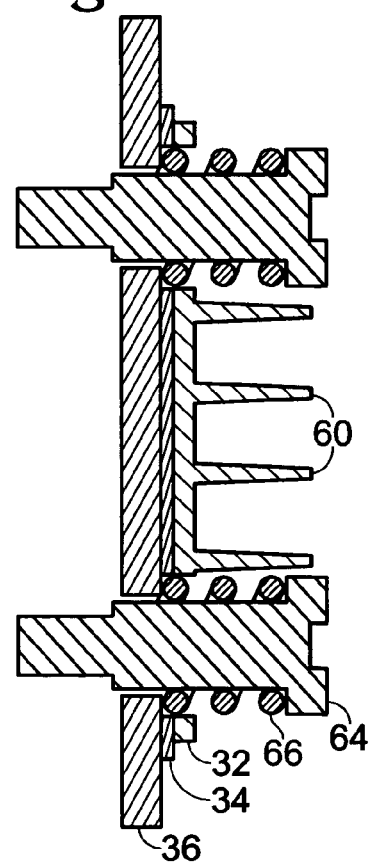
FIG. 8 is a cross-sectional view similar to than of FIG. 6, illustrating another embodiment of a digital micromirror device mounting system.

FIG. 6 further illustrates an exemplary configuration of engagement mechanisms 62 with DMD mounting system, including mounting screw 64 and a compression spring 66. Compression of spring 66 may occur upon tightening of screw 64. As illustrated, a portion of spring 66 may directly contact, or seat against, heat sink/stiffener 32. In other embodiments, spring 66 may seat against insulating layer 34 (as illustrated in FIG. 7), and/or circuit board 36 (as illustrated in FIG. 8). Moreover, in other embodiments, other types of engagement mechanisms such as clips, latches, locks, and so forth, may be used.

Although the present exemplary embodiments illustrate the use of the mounting system within a projection device, it should be appreciated that the mounting system described herein may be used in any suitable electronic device incorporating a circuit board that must be electrically and mechanically positioned relative to another component. For example, the mounting system may be used in electronic devices, such as display monitors, etc.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A projection device, comprising:
    a digital micromirror device;
    a circuit board, including a first face and a second face;
    an integrated heat sink/stiffener; and
    a plurality of engagement mechanisms;
    wherein the plurality of engagement mechanisms are adapted to operatively couple the digital micomirror device to the first face of the circuit board and to secure the integrated heat sink/stiffener to the second face of the circuit board; and wherein the integrated heat sink/stiffener is adapted to provide structural support to the circuit board and to draw thermal energy away from the digital micromirror device.

2. A mounting system for use with a digital micromirror device, comprising:
    a circuit board;
    an integrated heat sink/stiffener adapted to provide structural support to the circuit board, the integrated heat sink/stiffener including:
        a first side contoured similarly to the circuit board; and a second side including a plurality of formations to enlarge the surface area of the second side to dissipate thermal energy from the second side; and a plurality of engagement mechanisms;

wherein the plurality of engagement mechanisms is adapted to secure the first side of the integrated heat sink/stiffener against the circuit board with a compressive force and couple and align the circuit board with the digital micromirror device.

3. The projection device of claim 1 wherein the integrated heat sink/stiffener further comprises ridges for dissipating thermal energy.

4. The projection device of claim 1 wherein the plurality of engagement mechanisms comprise a mounting screw and a compression spring.

5. The projection device of claim 4 wherein at least a portion of the compression spring directly contacts the heat sink/stiffener.

6. The projection device of claim 1 wherein the engagement mechanisms facilitate at least one of electrical, mechanical, and optical alignment of the circuit board to the digital micromirror device.

7. The projection device of claim 1 wherein the integrated heat sink/stiffener and the circuit board include alignable holes adapted to receive the plurality of engagement mechanisms.

8. The projection device of claim 7 wherein the alignable holes are disposed along the perimeter of at least one of the integrated heat sink/stiffener and the circuit board.

9. The projection device of claim 1 wherein the heat sink/stiffener comprises rigid, thermally conductive material.

10. The projection device of claim 1 wherein the engagement mechanisms comprise at least one of clips, latches, and locks.

11. The mounting system of claim 2 wherein the plurality of formations are ridges.

12. The mounting system of claim 2 wherein the plurality of engagement mechanisms comprise a mounting screw and a compression spring.

13. The mounting system of claim 2 wherein at least a portion of the compression spring directly contacts the heat sink/stiffener.

14. The mounting system of claim 2 wherein the engagement mechanisms facilitate electrical alignment of the circuit board to the digital micromirror device.

15. The mounting system of claim 2 wherein the engagement mechanisms facilitate mechanical alignment of the circuit board to the digital micromirror device.

16. The mounting system of claim 2 wherein the engagement mechanisms facilitate optical alignment of the circuit board to the digital micromirror device.

17. The mounting system of claim 2 wherein the integrated heat sink/stiffener and the circuit board include alignable holes adapted to receive the plurality of engagement mechanisms.

18. The mounting system of claim 15 wherein the alignable holes are disposed along the perimeter of at least one of the integrated heat sink/stiffener and the circuit board.

19. The mounting system of claim 2 wherein the heat sink/stiffener comprises rigid, thermally conductive material.

20. The mounting system of claim 2 wherein the engagement mechanisms comprise at least one of clips, latches, and locks.

* * * * *